(12) United States Patent
Bach et al.

(10) Patent No.: US 7,324,611 B2
(45) Date of Patent: Jan. 29, 2008

(54) SYMBOL DECISION ADJUSTMENT IN DEMODULATOR

(75) Inventors: Susan E. Bach, Reston, VA (US); Kristin Farag, San Dimas, CA (US)

(73) Assignee: The Boeing Company, Chicago, IL (US)

( * ) Notice: Subject to any disclaimer, the term of this patent is extended or adjusted under 35 U.S.C. 154(b) by 577 days.

(21) Appl. No.: 10/391,994

(22) Filed: Mar. 18, 2003

(65) Prior Publication Data
US 2004/0184563 A1 Sep. 23, 2004

(51) Int. Cl.
*H04L 27/00* (2006.01)
(52) U.S. Cl. .................... 375/324; 375/264
(58) Field of Classification Search ............. 375/316, 375/320, 324, 329, 341, 261, 264
See application file for complete search history.

(56) References Cited

U.S. PATENT DOCUMENTS

| | | | |
|---|---|---|---|
| 4,866,395 A * | 9/1989 | Hostetter | 329/309 |
| 6,292,126 B1 * | 9/2001 | Chelehmal et al. | 341/155 |
| 7,197,090 B1 * | 3/2007 | Berger et al. | 375/317 |
| 2001/0010709 A1 * | 8/2001 | Iwamatsu et al. | 375/264 |
| 2002/0054649 A1 * | 5/2002 | Kokuryo et al. | 375/295 |
| 2003/0039318 A1 * | 2/2003 | Tong et al. | 375/298 |
| 2003/0112891 A1 * | 6/2003 | Ozaki | 375/296 |
| 2005/0220220 A1 * | 10/2005 | Belotserkovsky | 375/316 |

\* cited by examiner

*Primary Examiner*—Mohammed Ghayour
*Assistant Examiner*—Freshteh N Aghdam
(74) *Attorney, Agent, or Firm*—Timothy K. Klintworth; Wildman Harrold Allen & Dixon, LLP

(57) ABSTRACT

Methods and apparatus for use in making improved symbol decisions in a demodulator in the presence of distortion in the received signaling. In one implementation, a method includes the steps of: determining a centroid symbol location for a received symbol of a constellation, the centroid symbol location different than an ideal symbol location due to distortion of the received symbol; and adjusting a decision line bounding the received symbol based on the centroid symbol location. In preferred embodiments, the method is implemented in a satellite communication system, which the distortion is a nonlinear distortion and is caused by a high power amplifier at the transmitting terminal and in which bandwidth efficient modulation formats are used to transmit data at a high rate. In some embodiments, centroid symbol locations are used to improve soft decision decoding.

24 Claims, 7 Drawing Sheets

SYMBOL DECISION ADJUSTMENT IN DEMODULATOR

BACKGROUND OF THE INVENTION

1. Field of the Invention

The present invention relates generally to distortion in communication links, and more specifically to non-linear distortions caused by high power amplifiers in communication links.

2. Discussion of the Related Art

Bandwidth efficient modulation techniques are used to increase data rates without increasing bandwidth in a communication link. As efficiency is increased, e.g., by using higher order bandwidth efficient modulations, signal quality becomes more sensitive to nonlinear and linear distortions such that in order to maintain acceptable performance, complex components such as equalizers or linearizers must be added or the communication link suffers reduced range.

Bandwidth efficient modulation formats, such as 16 QAM (16-ary quadrature amplitude modulation) and 64-QAM, become increasingly non-constant in power with more efficiency. Particularly in most wireless and satellite communication systems, these modulation formats are very sensitive to AM (amplitude modulation)/AM and AM/PM (phase modulation) distortions caused by high power amplifiers, such as traveling wave tube amplifiers (TWTAs), at a given transmitter such that symbols at a receiver are not received at the ideal symbol location and may be received as an incorrect symbol resulting in a higher symbol error rate. FIG. 2 illustrates an I,Q plot for an ideal 16-QAM constellation, the X's denoting the ideal symbol location for a given symbol in I,Q space. FIG. 3 illustrates an I,Q plot over time of the 16-QAM constellation that has undergone a nonlinear distortion introduced for example, by a high power amplifier during transmission. The +'s indicating the location of measured individual received symbols over time (illustrated as clustered together). As can easily be seen, the received symbols are distorted from the ideal locations due to the AM/AM and AM/PM distortions. Many of the received symbols are close to the decision threshold lines 202 that the receiver uses to decide which symbol is received, which increases the probability of error in determining which symbols are received, particularly in the presence of other channel related distortions or noise present in the communication link or channel.

One solution to reduce the effects of such nonlinear distortions is to back off the high power amplifier, i.e., operate the amplifier at less than its full power level. However, since there is less transmit power, there is less distance between symbols of the modulation format. Thus, the signal is more susceptible to noise in the communication link. In a satellite communication system, this technique also results in the use of a high power amplifier that can provide more power than is actually used, disadvantageously resulting in extra weight and power on the satellite.

In another solution, the signal is predistorted through the use of another nonlinear circuit inserted in the channel prior to the source of the nonlinear distortions at the transmitter or after the signal is received at the receiver. Fixed versions of these additional circuits are hand-tuned specifically for the source of the distortion, e.g., the high power amplifier, and can not be adjusted for variations in performance due to end-of-life degradation or paths through redundant amplifiers. Adaptive versions of the circuits require complex control algorithms. Particularly in a satellite system, such circuits at the satellite add more weight, power and complexity to the satellite. Additionally, known circuit implementations do not completely cancel non-linearities and often cause more linear distortion; therefore, degrading the channel as much as they improve it.

SUMMARY OF THE INVENTION

The invention advantageously addresses the needs above as well as other needs by providing a demodulator using adjusted decision lines to account for distortions in received signaling at a receiver.

In one embodiment, the invention can be characterized as a method for use in a demodulator comprising the steps of: determining a centroid symbol location for a received symbol of a constellation, the centroid symbol location different than an ideal symbol location due to distortion of the received symbol; and adjusting a decision line bounding the received symbol based on the centroid symbol location.

In another embodiment, the invention can be characterized as a method for use in a demodulator comprising the steps of: receiving a given symbol of a constellation corresponding to received signaling, the given symbol having undergone a distortion; and determining which symbol of the constellation the given symbol actually is based on a mapping programmed according to decision lines defining each symbol of the constellation, the decision lines adjusted based upon determined centroid symbol locations for each symbol of the constellation, the centroid symbol locations different than ideal symbol locations due to the distortion.

In a further embodiment, the invention may be characterized as a demodulator comprising an analog to digital converter receiving I and Q data representing received symbols of received signaling and a mapping module coupled to an output of the analog to digital converter for determining which symbols of a constellation are actually received based on a mapping programmed according to decision lines defining the symbols of the constellation. The decision lines are adjusted based upon determined centroid symbol locations for each received symbol of the constellation, the centroid symbol locations different than ideal symbol locations due to distortion in the received signaling.

BRIEF DESCRIPTION OF THE DRAWINGS

The above and other aspects, features and advantages of the present invention will be more apparent from the following more particular description thereof, presented in conjunction with the following drawings.

Corresponding reference characters indicate corresponding components throughout the several views of the drawings.

DETAILED DESCRIPTION

The following description is not to be taken in a limiting sense, but is made merely for the purpose of describing the general principles of the preferred embodiments. The scope of the invention should be determined with reference to the claims.

Figure 1:
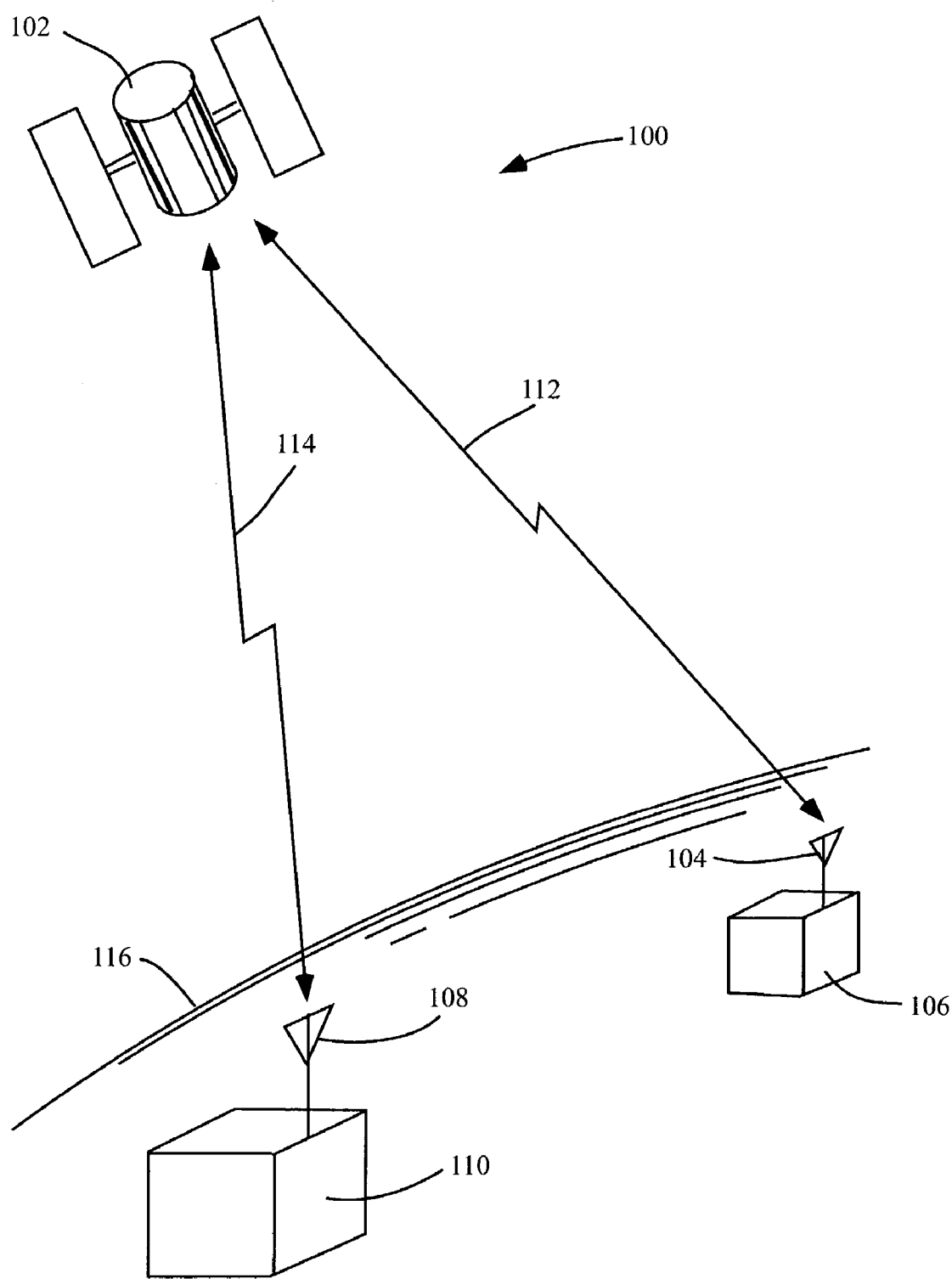
FIG. 1 is a diagram of a satellite-based communication system including a satellite and terrestrial communication terminals for implementing demodulation techniques in accordance with several embodiments of the invention.

Referring first to FIG. 1, a schematic view of a satellite-based communications system 100 is shown. A gateway station 110 on Earth 116 having an antenna 108, a communication terminal 106 having an antenna 104, and a satellite 102 in orbit around the Earth 116 are shown. Also shown are a communication link 114 between the gateway station 110 (also referred to generically as a communication terminal) and the satellite 102 and a communication link 112 between the satellite 102 and the communication terminal 106.

The communication terminal 106 (fixed or mobile) communicates with the gateway station 110 through the communication links 112 and 114 via the satellite 102. The communication links 112 and 114 provide a medium for a variety of channels to pass.

Figure 2:
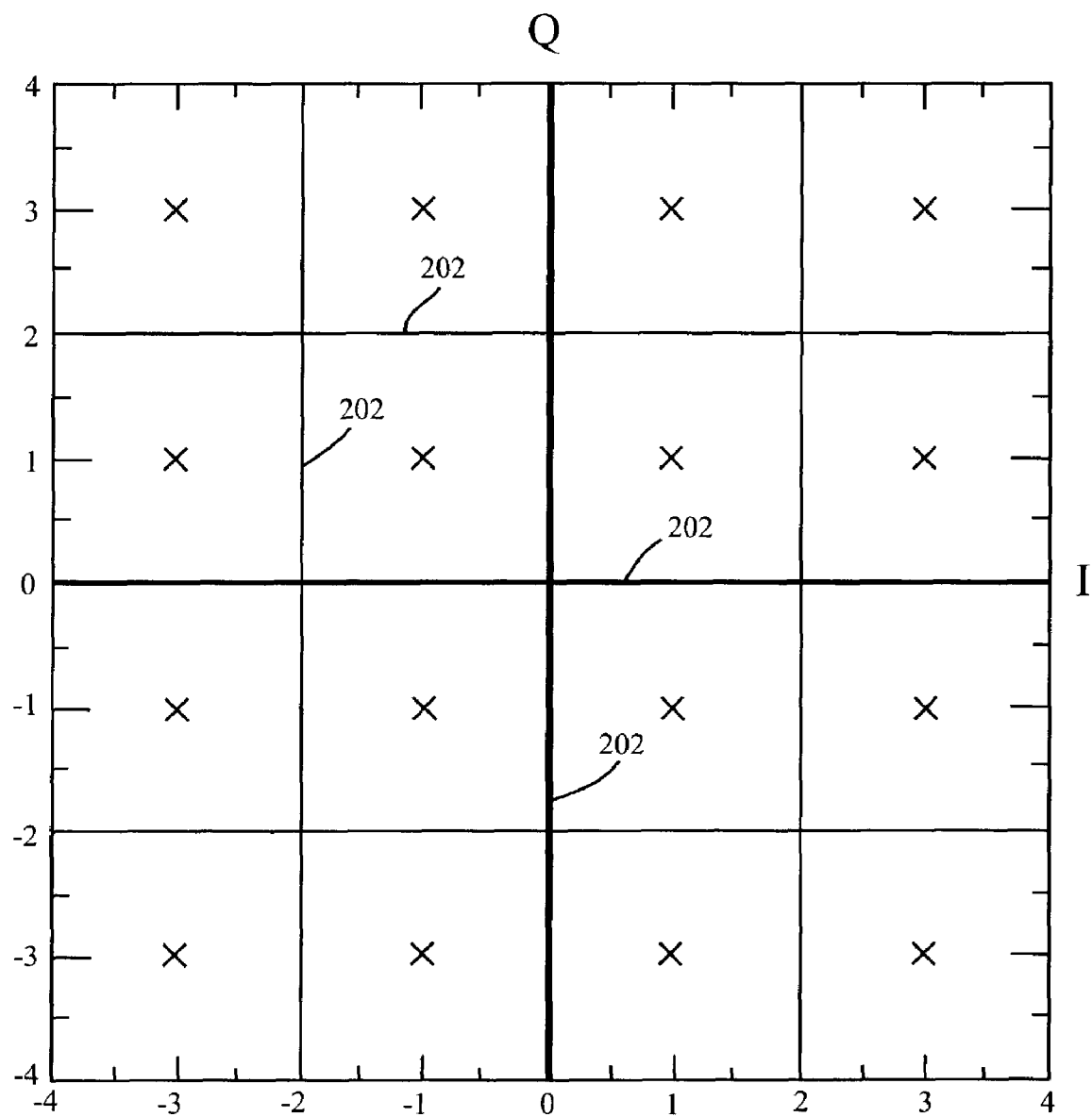
FIG. 2 is an I,Q plot for an ideal 16-quadrature amplitude modulation (16-QAM) constellation including conventional decision lines or boundaries.
Figure 3:
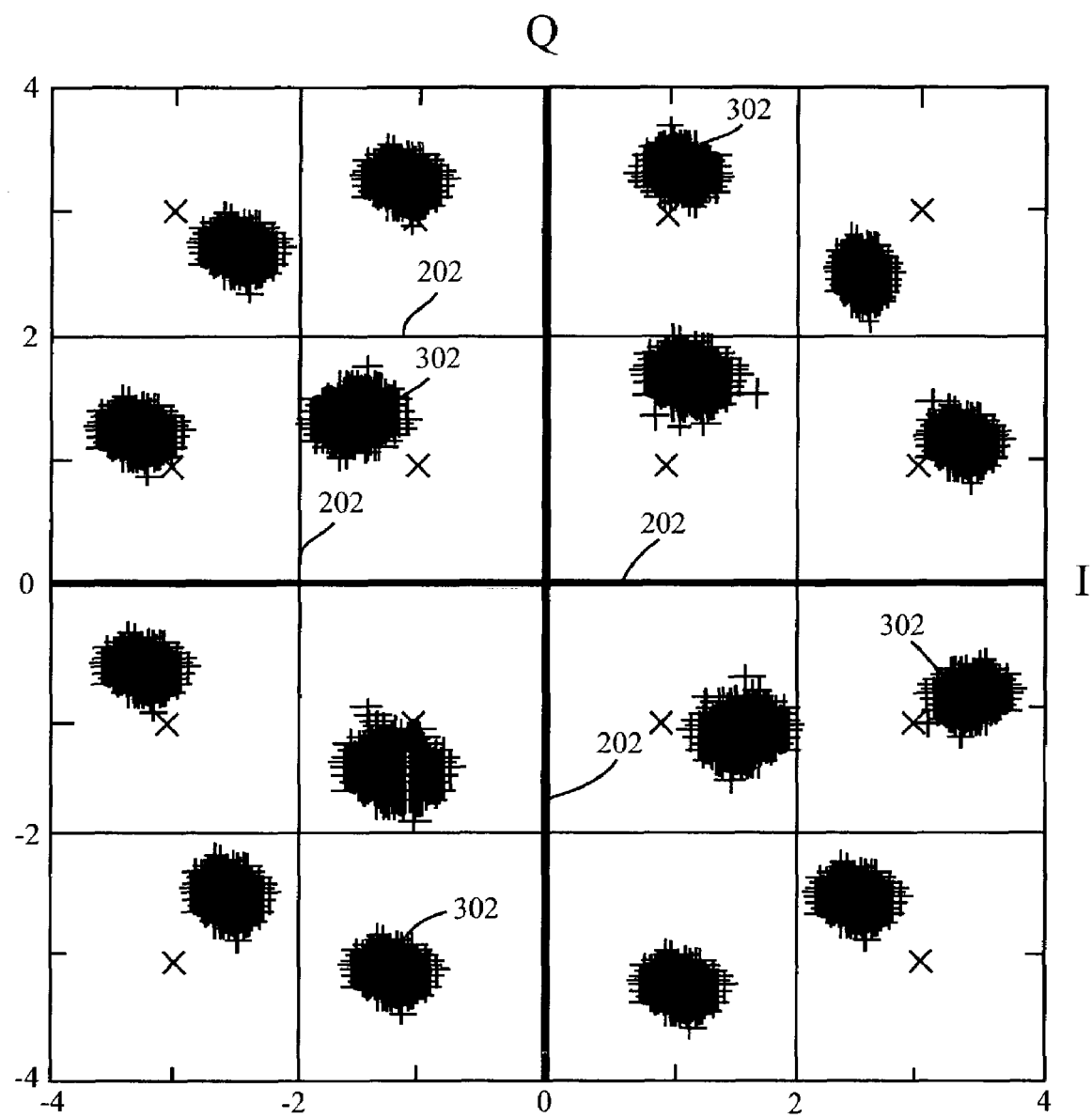
FIG. 3 is an I,Q plot of many received symbols of the 16-QAM constellation of FIG. 2 in which received symbols have undergone a nonlinear distortion introduced for example, by a high power amplifier during transmission.

In the downlink path from the satellite 102 to the gateway station 110 or to the communication terminal 106, the satellite 102 uses a high power amplifier to appropriately amplify the signaling transmitted such that it can be received with an acceptable bit error rate at the given distance. For example, most satellite transmitters use a traveling wave tube amplifier (TWTA). Such high power amplifiers introduce nonlinear distortions (e.g., AM/AM and AM/PM distortions), in the transmitted signaling. AM/AM distortions expand or compress signal power while AM/PM distortions produce a different phase rotation for symbols of different power levels. This nonlinear distortion is increasingly problematic as the data rate is increased, for example, through the use of bandwidth efficient modulation formats (e.g., 16-QAM, 64-QAM, etc.). As described above, FIG. 2 illustrates the ideal symbol locations for a 16-QAM bandwidth efficient modulation format, while FIG. 3 illustrates a nonlinear distortion that affects the actual received location of the transmitted symbols. As shown in FIG. 3, many received actual symbols (indicated as +'s) generally define a centroid symbol location 302. A centroid symbol location 302 is defined as an average location of where a particular symbol occurs in the constellation given the nonlinear distortion. In one embodiment, the centroid symbol location 302 is located at a center of a cluster of measured symbols (i.e., a cluster of +'s in FIG. 3.). As illustrated, the distortion compresses the constellation, i.e., the constellation appears circular.

The demodulator in a receiver (e.g., located within communication terminal 106 or gateway station 110), uses the decision lines 202 to decide which symbol is received. However, due to the nonlinear distortion, many received symbols are pushed closer to a given decision line and; thus, increases the probability of error. With traditional fixed decision lines based upon an ideal constellation (e.g., decision lines 202), the decreased distance of received symbols from decision lines causes degraded error performance, particularly in the presence of other channel distortions and noise.

According to several embodiments of the invention, a demodulator is provided that adjusts the decision lines 202 based upon the measured or determined centroid symbol locations and makes decisions based upon the adjusted decision lines. Thus, the demodulator can more accurately decide which symbol is actually received. It is noted that in accordance with these embodiments, it is unnecessary to use conventional methods of undoing such distortions. However, it is noted that the present techniques do not reduce or remove the distortion, these technique simply provide adjusted decision thresholds that the demodulator uses to decide which symbol is actually received. Thus, such techniques avoid the need for additional predistortion circuitry, equalizers or linearizers, e.g., that would add extra weight, power and complexity to the satellite 102. Additionally, the high power amplifier at the transmitting terminal is not required to be backed off, i.e., it may be operate at full power. This is important in satellite links since a lower power high power amplifier may be used onboard the satellite, decreasing weight and power consumed at the satellite. In further embodiments, the improved decision making at the demodulator may be used for improved soft decision decoding.

It is noted that although several embodiments of the invention are described in the context of space to ground wireless communication links, for example, in a satellite communication system, that the techniques of many embodiments may be applied in wireless and wireline communication systems. They are particularly applicable where there is a source of nonlinear distortion in the communication link with bandwidth efficient modulation formats. In one example, such techniques are applicable in a system requiring the use of a high power amplifier used to transmit the signaling a given distance, the high power amplifier introducing a nonlinear distortion in the transmitted signaling. Furthermore, although 16-QAM is described herein as a representative bandwidth efficient modulation constellation, it is understood that the present techniques apply to any constellation, (e.g., square constellations such as M-ary quadrature amplitude modulation or circular constellations such as 12-4), which uses fixed decision thresholds or lines (e.g., straight or curved) to make symbol decisions. 16-QAM is described as an example, since it is a relatively simple constellation and can easily be generated at a transmitting terminal (e.g., satellite 102) using analog low power circuits.

Figure 4:
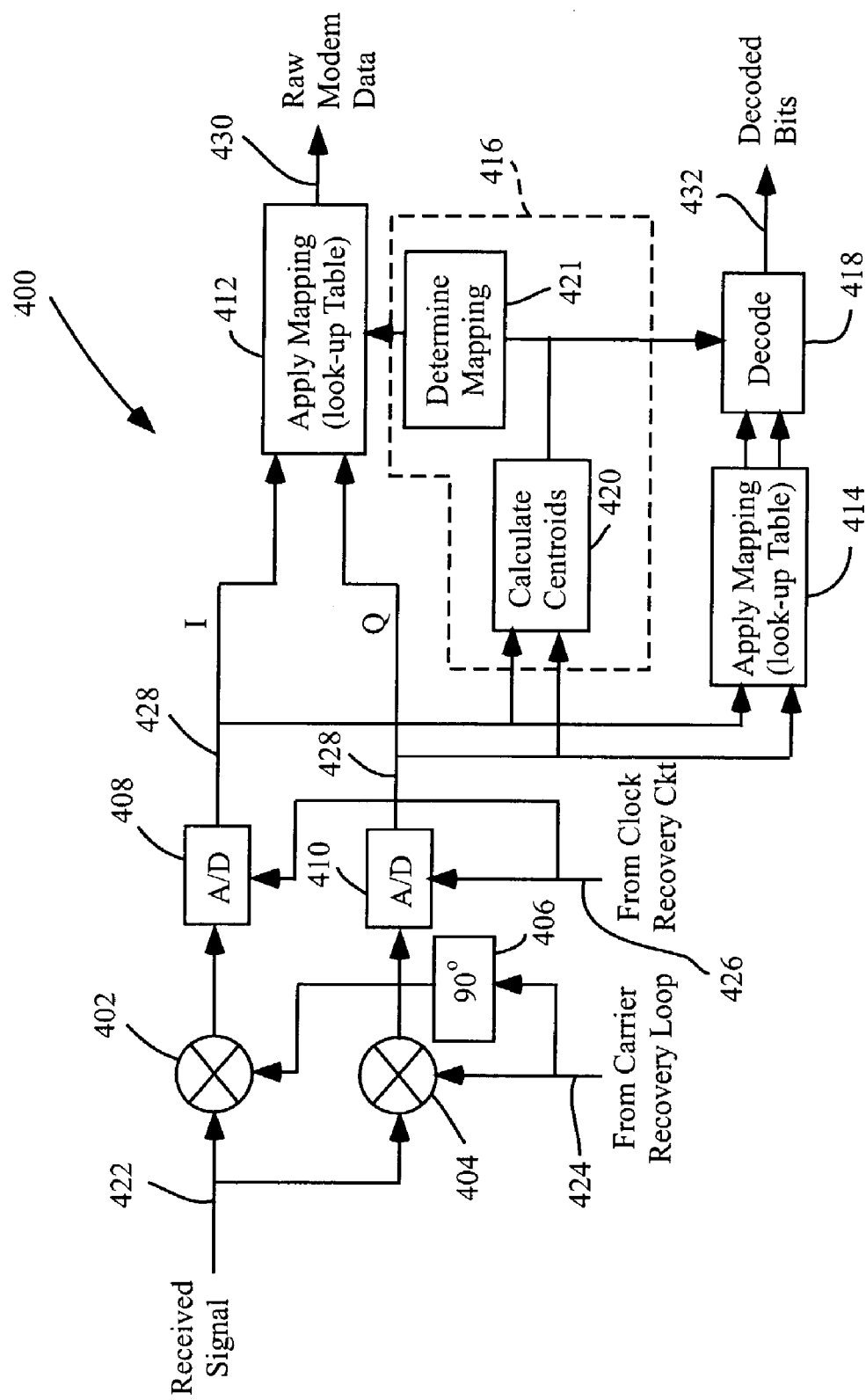
FIG. 4 is a demodulator of a receiver located for example in a terrestrial communication terminal of the system of FIG. 1 that adjusts decision lines to account for distortions, such as those in FIG. 3, in the received signaling in accordance with several embodiments of the invention.

Referring next to FIG. 4, shown is a functional block diagram of a demodulator of a receiver located in a terrestrial communication terminal of the system of FIG. 1 that adjusts decision boundaries to account for distortions, such as those illustrated in FIG. 3, in the received signaling in accordance with several embodiments of the invention.

The demodulator 400 includes multipliers 402, 404, a 90 degree phase shift 406, analog-to-digital converters 408, 410 (also referred to as A/D converters 408, 410), mapping modules 412, 414, a mapping adjustment module 416 and a decoder 418. The mapping adjustment module 416 includes a calculate centroids block 420 and a determine mapping block 421. Also illustrated are a received signal 422, a carrier recovery signal 424, a clock signal 426, digital I/Q signal 428, raw modem data 430 and decoded bits 432.

In operation, a transmitter, e.g., at satellite 102 transmits signaling to a receiver (e.g., at communication terminal 106 or gateway station 110). The received signal is received at a receiving element (e.g., antenna 104 or 108), downconverted to baseband and coupled to the demodulator 400. In this example, it is assumed that the signaling was modulated using 16-QAM and that the received signal 422 has undergone a nonlinear distortion, e.g., from a high power amplifier. At the demodulator 400, the received signal 422 is coupled to both multipliers 402 and 404. At multiplier 404, the received signal 422 is multiplied with the carrier recovery signal 424, while at multiplier 402, the received signal is multiplied by the carrier recovery signal 424 having been shifted 90 degrees by the 90 degree phase shift 406. The output of the multipliers 402 and 404 is coupled to A/D converters 408 and 410, which each input the clock signal 426 recovered from the received signaling, i.e., the signal is sampled using the recovered clock signal 426. In this embodiment, the A/D converters 408 and 410 each output a digital signal representing the received symbol, i.e., digital I/Q signal 428. As is well known, the digital I/Q signal 428 includes an In-phase value (I) and a Quadrature phase (Q) value. In one embodiment, the digital signal output from each A/D converter 408 and 410 includes more bits than are minimally required to define a symbol. For example, for a 16-QAM constellation minimally requires that each A/D converter 408 and 410 output 2 bits. Thus, in an embodiment receiving a 16-QAM signal, each A/D converter 408 and 410 outputs more than 2 bits, preferably 4 or more bits.

As illustrated in FIG. 4, there are 3 paths for the digital I/Q signal: (1) the digital I/Q signal 428 is coupled to the mapping module 412, (2) the digital I/Q signal 428 is coupled to the mapping adjustment module 416, and (3) the digital I/Q signal 428 is coupled to the mapping module 414. As is conventionally done, the mapping module 412 applies the decision lines or decision thresholds to the received symbol indicated by the digital I/Q signal 428 and outputs a set of bits defining the symbol decided upon according to thee mapping. In one embodiment, the mapping modules 412, 414 are look-up tables which use stored values to look up and produce an output depending on the input bits. For example, mapping module 412 is a look-up table that uses stored values to look-up and output the symbol, the stored values based upon the decision lines. As is described further below, the mapping module 414 provides the output required by the decoder 418, e.g., the symbol and/or probabilities. Conventional mapping look-up tables store values based on the fixed decision lines based upon the ideal constellation. For example, the straight decision lines 202 illustrated in FIGS. 2 and 3 are stored in a conventional demodulator. In another embodiment, one or more of the mapping modules 412, 414 run an algorithm that determines the appropriate output (e.g., the symbol for mapping module 412) depending on the input bits rather than use a look-up table. In a further embodiment, one or more of the mapping modules 412, 414 are a combination of a look-up table and an algorithm that determines the output depending on the input bits. Embodiments utilizing an algorithm may be preferred as the number of input bits increases, since an algorithm may reduce the memory required if a look-up table were employed.

Figure 5:
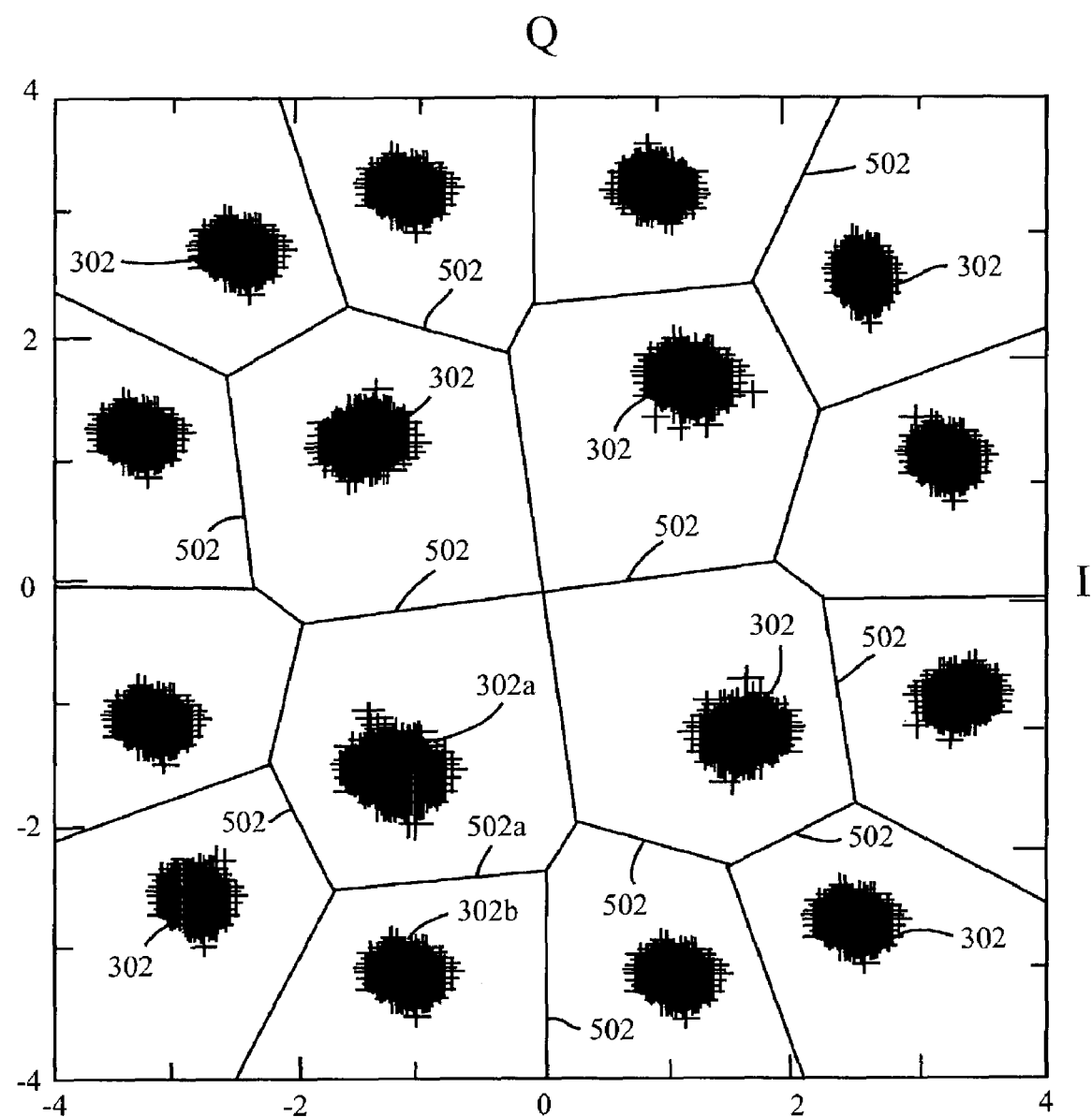
FIG. 5 is an I,Q plot of a 16-QAM constellation in which the demodulator of FIG. 4 has adjusted the decision lines to compensate for distortions in the received signaling according to one embodiment.

According to an embodiment of the invention, the mapping module 412 is loaded or programmed according to adjusted decision lines or decision thresholds that will account for the nonlinear distortion introduced into the received signal 422. Referring to FIG. 5, an I,Q plot of a 16-QAM constellation is shown in which the demodulator 400 utilizes adjusted decision lines to compensate for distortions in the received signaling according to one embodiment. As shown in FIG. 5, rather than using the straight decision lines 202 of FIGS. 2 and 3, adjusted decision lines 502 are used (i.e., the mapping module 412 is loaded according to the adjusted decision lines) to output the raw modem data 430.

In one embodiment, given a determined centroid symbol location 302 of received symbols for a given symbol, a decision line 502 defining at least one decision boundary of the given symbol is adjusted. In preferred embodiments, for two adjacent symbols of the given constellation, measured or determined centroid symbol locations for the two adjacent symbols are used to adjust the decision or threshold defined therebetween. For example, a decision line 502 defining a boundary between two adjacent symbols is moved to be substantially equidistant between the centroid symbol locations for the two adjacent symbols. This maximizes the minimum distance between each decision line 502 and its surrounding symbols, and consequently improves symbol error rate. For example, as illustrated in FIG. 5, decision line 502a defining the boundary between two adjacent symbols is moved to be substantially equidistant between centroid symbol locations 302a and 302b. This determination is made for each decision line 502 defining the boundary between every adjacent pair of symbols of the constellation and provides an adjusted mapping, such as that illustrated in FIG. 5 which is based on the particular nonlinear distortion illustrated. Thus, in contrast to conventional approaches, the mapping module 412 has been programmed according to adjusted decision lines 502 based upon the actual received centroid symbol locations 302.

In order to provide the resolution to adjust the decision lines, the A/D converters 408, 410 should output more bits than are minimally required to define a given symbol. For example, a 16-QAM constellation minimally requires that each A/D converter 408 and 410 output 2 bits. Thus, in an embodiment receiving a 16-QAM signal, each A/D converter 408 and 410 outputs more than 2 bits, e.g., 4 or more bits. Using 4 bits output from each A/D converter 408 and 410 as an example, the mapping module 412 outputs 4 bits (2 I and 2 Q) that define the symbol. In an example using a 64-QAM constellation, each A/D converter 408, 410 preferably outputs 6 or more bits (since 3 bits are minimally required to define the symbol). Using 6 bits output from each A/D converter 408 and 410 as an example, the mapping module 412 outputs 6 bits (3 I and 3 Q) that define the symbol.

Advantageously, this approach does not require additional predistortion circuitry at the transmitter or the receiver, which if used, would introduce additional complexity and power requirements and potentially worsen the distortion. Likewise, equalizers or linearizers are not required. Again, the decision line adjustment does not remove or limit the distortion, it simply adjusts the demodulator's decision making in order to more accurately read or interpret the received symbols. Thus, the nonlinearity or noise is not reduced over time, it just becomes less of a problem over time.

The adjusted mapping including adjusted decision lines may be determined in several ways. In one embodiment, the adjustments are determined in use of the system, such that the I and Q data for each received symbol is stored and averaged over time to make incremental adjustments to the decisions. That is, centroid symbol locations 302 are determined in use. In another embodiment, the nonlinearity introduced is determined prior to operation, for example, by testing the given source of the nonlinearity in order to determine the centroid symbol locations 302 and program the mapping module 412. In this case, the adjusted mapping is hand-tuned to the source of the distortion.

In the first approach where the decision line adjustments are determined in use, the mapping module 412 (e.g., look-up table) is initially programmed according to the traditional decision lines 202 corresponding to the known constellation having no distortion, e.g., straight or circular decision lines depending on the constellation. In use, the I and Q data (i.e., the digital I/Q signal 428) is coupled to the mapping module 412 and symbol decisions are made based upon the unadjusted decision lines. In parallel to this path, the digital I/Q signal 428 is coupled to the mapping adjustment module 416. For each received symbol, the exact location in I,Q space is stored at the calculate centroids block 420. Every time that same symbol is received it is averaged with the other locations of that symbol previously received and stores this average as a centroid symbol location 302. Over time, a good average of where a particular symbol hits on the I,Q plot (i.e., the centroid symbol location 302 of the symbol) is determined. Over time, the centroid symbol location 302 for each symbol will become more accurate if the nonlinear distortion remains relatively constant.

The determine mapping block 421 uses the determined centroid symbol locations 302 to make adjustments to the decision lines between adjacent symbols. In preferred embodiments, each decision line 502 is adjusted to be approximately equidistant between two adjacent centroid symbol locations 302. This will maximize the minimum distance between each decision line and its surrounding symbols and thus, improve the error rate. The mapping module 412 is then programmed, loaded or updated according to the adjusted mapping (e.g., the values in the look-up table are altered or the algorithm is altered to reflect the adjusted mapping) such that improved symbol decisions can be made.

It is noted that the determination of the centroid symbol locations 302, adjusting of the decision lines 502 and the reprogramming of the mapping module 412 may be continuously updated or periodically updated as desired. An advantage of this technique is that it is adaptable to changing nonlinearities in the received signaling. It is noted that the nonlinear distortion in most high power amplifiers is relatively constant throughout the life of the amplifier; however, once the useful life of the amplifier has ended, a replacement amplifier may introduce a different nonlinear distortion. By adaptively updating the determined centroid locations 302, such a system can handle changes in the nonlinearity introduced. Additionally, a particular communication link may be altered such that the signaling passes through redundant amplifiers. It is further noted that initially, the error rate at the raw modem data 430 should be higher until the adjusted decision lines 502 are implemented with mapping module 412.

In an alternative embodiment, if the source of the nonlinearity is known before operation, the mapping module 412 can be preprogrammed according to the predetermined and adjusted decision lines. For example, in a given satellite communication link, the exact high power amplifier (e.g., TWTA) to be used at the satellite 102 is known. This high power amplifier is tested and the nonlinearity that will be introduced is quantified such that the centroid symbol locations 302 given the nonlinearity are predetermined. In this case, the demodulator is hand-tuned to the specific source of the nonlinearity and the mapping module 412 is programmed according to the adjusted decision lines such that the mapping adjustment module 416 is not needed in the demodulator 400. However, such an implementation can not be adjusted for variations in performance due to end-of-life degradation or paths through redundant amplifiers. Thus, in this embodiment, the mapping adjustment module 416 is not used.

However, in some embodiments, the mapping adjustment module 416 is still used to be able to make adjustments based upon end-of-life performance degradation or passing through redundant amplifiers or other changes in the nonlinearity. In this case, the mapping module 412 is preprogrammed according to the predetermined adjusted decision lines 502, but it retains the ability to make further adjustments in use. Thus, in this embodiment, the mapping adjustment module 416 is used.

Figure 6:
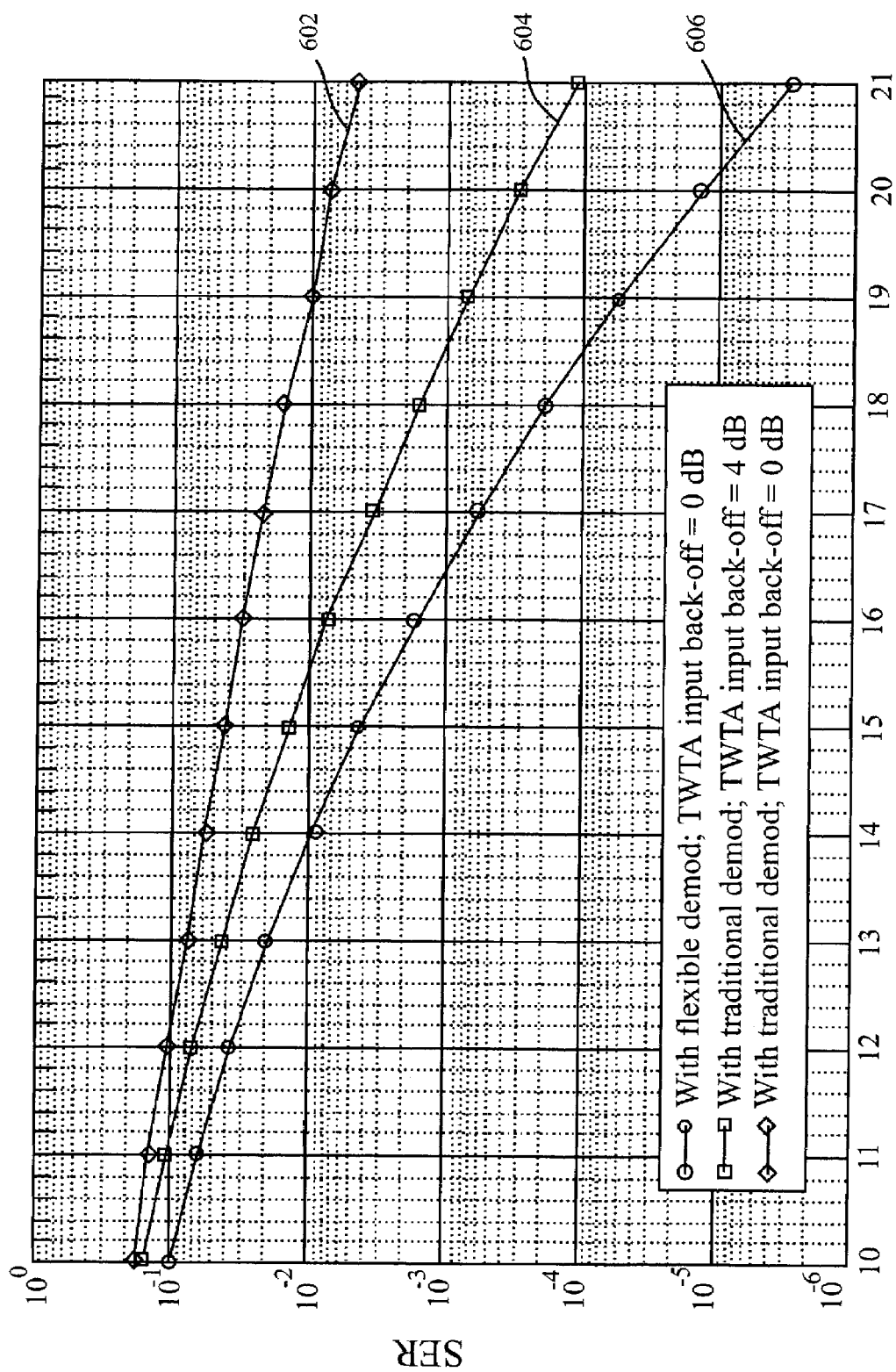
FIG. 6 is a plot of the symbol error vs. signal to noise ratio for received signaling with and without using the decision line adjustments of the embodiments of the FIGS. 4 and 5.

Referring briefly to FIG. 6, a plot is shown of the symbol error vs. signal to noise ratio (e.g., Psat/(Rb*No) for received signaling with and without using the decision line adjustments of the embodiments of the FIGS. 4 and 5. In this example as described above, 16-QAM is the constellation and the high power amplifier is a TWTA. Line 602 represents operation of the TWTA at saturation (full power) while line 604 represents operation of the TWTA at an optimal operating point of 4 dB input power back-off. The conventional technique of line 604 (operating the high power amplifier at less than full power) illustrates an improvement in error rate relative to full power operation of the TWTA in line 602. Line 606 represents operation of the TWTA at saturation (full power), but using adjusted decision lines 502 in accordance with one embodiment of the invention. As can be seen, line 606 provides an even further improvement over the traditional demodulator. For example, at an error rate of $10^{-3}$, the demodulator 400 using adjusted decision lines 502 provides over 2 dB of improvement over the traditional demodulator. This results in an improved error rate at a given link range or improved range for a given error rate.

There are several advantages of the techniques according to several embodiments of the invention. For example, the high power amplifier at the transmitting terminal may be run at saturation at the transmitting terminal, rather than having to back off the transmit power. This is particularly important where the high power amplifier is implemented at a satellite 102 where weight and power consumption are important concerns. Thus, a slightly smaller power high power amplifier may be selected that is run at saturation rather than selecting a higher power amplifier that is backed off. This provides less weight and power consumption on the satellite 102. Therefore, less expensive amplifiers may be used at the transmitting terminal.

Furthermore, such techniques avoid the need for the additional complexity added by implementing nonlinear equalizers or linearizers to account for the nonlinearity. Likewise, predistortion circuits are not required to try to undo some of the nonlinearity of the TWTA. Particularly on a satellite, such additional predistortion circuits add extra weight and power consumption to the satellite 102. Additionally, such predistortion circuits are known to possibly worsen the nonlinearity and error rate than actually improve it.

In another embodiment, the adjustment of decision lines or thresholds is used in conjunction with soft decision decoding. Soft decision decoding uses Euclidean distance between received I and Q values and the expected symbols (i.e., the ideal symbol location) to determine the probability that a particular code word was sent. By adjusting the location of the expected symbols (e.g., to the centroid symbol location), the performance of the code is improved. The complexity of the decoding algorithm may also be improved in the case where a number of decoding iterations are required, such as with complex iterative codes, e.g., a Turbo codes.

For example, as illustrated in the FIG. 4, the digital I/Q signal 428 output from the A/D converters 408 and 410 is also coupled to the mapping module 414 (e.g., look-up table, algorithm or combination), the output of which is coupled to the decoder 418. In this embodiment, the digital I/Q signal 428 is a set of bits that represent the symbol received. In this path according to one embodiment, the mapping look-up table 414 inputs the set of bits and outputs a set of bits indicating the symbol that it determines was received Oust as the mapping module 412) and also outputs a probability for each bit of whether it was a 1 or a 0. As done in the mapping module 412 as described above, the mapping module 414 decides which symbol is received based upon the mapping programmed into the mapping module 414 based upon the decision lines. Again, as described above, the mapping module 414 is programmed according to adjusted decision lines 502 based upon the determined or measured centroid symbol locations 302 in the mapping adjustment module 416. The mapping module 414 is also programmed according to the centroid symbol locations which updates the probability information. The decoder 418 uses the probabilities to decide what are the decoded bits or code word as conventionally done and outputs the decoded bit 432. It is noted that the output of the mapping module 414 depends on the specific decoder 418 to be used in the implementation. For example, the mapping module 414 may be programmed to output the symbol decided (similar to the mapping module 412) and/or may be programmed to output probability determinations. Thus, the mapping module 414 is programmed to output the required inputs for the decoder 418, the programming based on one or more of the adjusted decision lines and the centroid symbol locations.

Without providing for an adjustment to the decision lines 202, a conventional decoder would receive the set of bits indicating the received symbol and also receive the probability that each bit was a 1 or a 0; however, the probability is based on the distance of the received symbol from the ideal symbol location (e.g., the X's in FIGS. 2 and 3) for the particular symbol. In the presence of a nonlinear distortion, the actual symbol received will be distorted such that it will not be received at the ideal location. For example, assuming little additional noise, the symbol will be received near the centroid symbol location 32, rather than at the ideal location. Thus, in a conventional system without adjusting the decision lines or determining centroid symbol locations, the probability for a given bit will be based on its distance from the ideal symbol location. For example, if the received symbol was received at its respective centroid symbol location 302, a conventional system would think that the probability that the particular bits are the proper bit would be lower than it actually is.

In contrast, by determining centroid symbol locations for each received symbol and adjusting the decision lines and probabilities accordingly per several embodiments of the invention (and programming the mapping module 414 according to the appropriate adjusted decision lines and centroid symbol locations), the probability output from the mapping module 414 is based on the distance of the received symbol from its respective centroid symbol location 302, rather than the ideal symbol location. This provides a more accurate probability output to the decoder 418; thus, enabling the decoder 418 to make better soft decisions and improve the coding performance of the system.

Therefore, according to one embodiment, centroid symbol locations are determined (e.g., predetermined or determined and averaged during use). Then, the probability for each bit of a received symbol is determined based on the centroid symbol location 302, rather than the ideal symbol location. Thus, the mapping module 414 is updated or programmed according to an updated mapping having adjusted decision lines as described above and is also programmed according to the centroid symbol locations 302 so that the improved probabilities can be estimated, which will result in better soft decisions made by the decoder 418.

Figure 7:
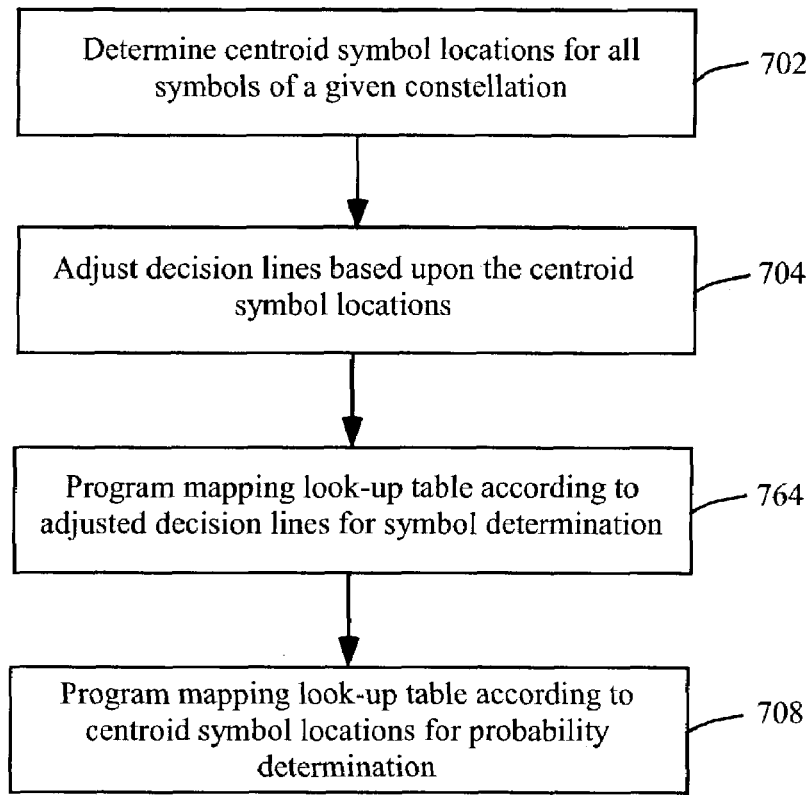
FIG. 7 is a flowchart illustrating the steps performed, for example, by the demodulator of FIG. 4, in accordance with one embodiment of the invention.

Referring next to FIG. 7, a flowchart is shown illustrating the steps performed, for example, by the demodulator of FIG. 4, in accordance with one embodiment of the invention. In one embodiment, for a given constellation (modulation format), the centroid symbol locations for all symbols of the given constellation are determined (Step 702). Generally, the received symbols have undergone a nonlinear distortion such that symbols may not be received at the ideal symbol locations. For example, the nonlinear distortion is caused by a high power amplifier (such as a TWTA) at the transmitting terminal. Additionally, due to further channel distortions and noise, the received symbols may be further offset. As described herein, the centroid symbol locations may be predetermined by measuring the specific source of the nonlinear distortion such that the amount of distortion (e.g., AM/AM and AM/PM distortions) is known. Alternatively, the centroid symbol locations are determined in operation of the system. For example, the location in I,Q space for each received symbol is stored and averaged with many other locations for the same symbol to produce the centroid symbol location. In either case, the centroid symbol location is generally the average location (e.g., within I,Q space) for the received symbol at a receiving terminal having undergone a distortion. For example, this step may be performed in the calculate centroids block 420 of FIG. 4.

Next, the decision lines or decision thresholds of the particular constellation are adjusted based upon the centroid symbol locations (Step 704). In a broad sense, a given decision line defining a boundary for a given symbol is adjusted based upon the determined centroid symbol location. In one specific embodiment, the decision lines are adjusted to be approximately equidistant between two adjacent centroid symbol locations. This maximizes the minimum distance between each decision line and its surrounding symbols. This step may be performed by the determine mapping block 421 of FIG. 4.

Then, a mapping module or function (e.g., a look-up table) is updated or programmed according to the adjusted decision lines for symbol determination from the received symbol (Step 706). For example, the mapping module 412 (and the mapping module 414 depending on the embodiment) is programmed according to the updated or adjusted decision line information in order to make better decisions as to which symbol is actually received. In one embodiment, the determine mapping block 421 updates or programs one or more of the mapping modules 412 and 414. In another embodiment, one or more of the mapping modules 414, 414 are loaded or preprogrammed according to the adjusted decision line information, which is remeasured. It is noted that the programming step may occur once (e.g., at the beginning of operation or once after a given time period if source of the nonlinear distortion is relatively constant) or may be performed continuously or periodically (e.g., at defined intervals) to account for changes in the nonlinear distortion introduced.

Then, a mapping module or function to be used in conjunction with soft decision decoding is also updated or programmed according to the centroid symbol locations (Step 708) so that it can make improved probability determinations for the values of the received bits of the received symbols. For example, the determine mapping block 421 also updates or programs the module 414 or it is preprogrammed (e.g., the mapping module 414 is programmed with values or an algorithm reflecting the centroid symbol locations). Likewise, the programming step 708 may occur once, periodically or continuously depending on the specific implementation.

Figure 8:
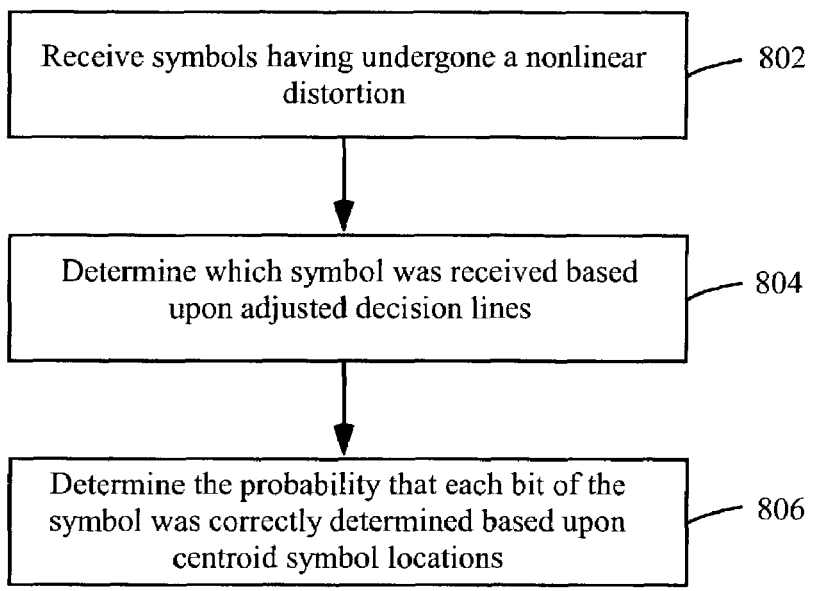
FIG. 8 is a flowchart illustrating the steps performed, for example, by the demodulator of FIG. 4, in accordance with another embodiment of the invention.

Referring next to FIG. 8, a flowchart is shown illustrating the steps performed, for example, by the demodulator of FIG. 4, in accordance with one embodiment of the invention. In one embodiment, symbols are received at a receiving communication terminal (Step 802), the symbols having undergone a nonlinear distortion, such as described herein. The demodulator then determines what symbol was received based upon adjusted decision lines (Step 804). The decision lines may be adjusted such as described above. Next, for purposes of soft decision decoding, the demodulator then determines the probability that each bit of the received symbol was correctly determined based upon centroid symbol locations (Step 806).

It is understood that the above methods may be applied in any wireless or wireline communication system in which symbols are transmitted within a modulation format having fixed decision lines or thresholds and in which a distortion causes symbols to be received at other than the ideal symbol locations. Accordingly, several embodiments provide techniques, not to remove the distortion, but to better deal with the distortion at the receiving terminal, such that the transmitted information may be more accurately received at a given link range. In one embodiment, these techniques are particularly useful in wireless satellite communication systems, where it is desired to minimize complexity, weight and power consumption at a transmitting satellite and where bandwidth efficient modulation formats are used to effect high data rates.

It is noted that many of the functional blocks of the demodulator 400 of FIG. 4 may be implemented as a set of instructions that are performed in dedicated hardware, firmware or in software using a processor or other machine to execute the instructions to accomplish the provided functionality. Similarly, one or more of the steps of FIGS. 7 and 8 may be performed as a set of instructions that are performed in dedicated hardware, firmware or in software using a processor or other machine to execute the instructions to accomplish the given steps.

While the invention herein disclosed has been described by means of specific embodiments and applications thereof, numerous modifications and variations could be made thereto by those skilled in the art without departing from the scope of the invention set forth in the claims.

What is claimed is:

1. A method for use in a demodulator comprising:
   determining a centroid symbol location for a received symbol of a constellation, the centroid symbol location different than an ideal symbol location due to distortion of the received symbol; and
   adjusting a decision line bounding the received symbol based on the centroid symbol location;
   wherein the step of determining comprises predetermining the centroid symbol location prior to operation of a communication system by considering a known source of the distortion.

2. The method of claim 1 wherein the step of determining comprises:
   receiving multiple transmissions of the received symbol; and
   averaging a location of the multiple transmissions of the received symbol.

3. The method of claim 1 wherein the determining step further comprises:
   determining the centroid symbol location for the received symbol of a constellation, the centroid symbol location different than the ideal received symbol location due to a nonlinear distortion of the received symbol.

4. The method of claim 1 further comprising:
   programming a mapping module according to the decision line having been adjusted in order to improve symbol decisions.

5. The method of claim 1 further comprising:
   programming a mapping module according to the centroid symbol location to improve probability determination for decoding.

6. A method for use in a demodulators comprising:
   determining a centroid symbol location for a received symbol of a constellation, the centroid symbol location different than an ideal symbol location due to distortion of the received symbol; and
   adjusting a decision line bounding the received symbol based on the centroid symbol location;
   wherein the adjusting step comprises;
   adjusting the decision line bounding the received symbol to be substantially equidistant between the centroid symbol location and an adjacent centroid symbol location and an adjacent centroid symbol location of an adjacent symbol;
   wherein the step of determining further comprises predetermining the centroid symbol location prior to operation of a communication system by considering a known source of the distortion.

7. The method of claim 6 wherein the adjusting step further comprises:
   adjusting the decision line bounding the received symbol based on the centroid symbol location such that predistortion of the constellation is not needed to account for the distortion.

8. The method of claim 6 wherein the adjusting step further comprises:
   adjusting the decision line bounding the received symbol based on the centroid symbol location such that equalization of the constellation is not needed to account for the distortion.

9. The method of claim 6 wherein the adjusting step further comprises:
   adjusting the decision line bounding the received symbol based on the centroid symbol location allows for a high power amplifier at a transmitting communication terminal to operate at saturation.

10. The method of claim 6 wherein the distortion is caused by a high power amplifier at a transmitting communication terminal.

11. The method of claim 6 wherein the constellation comprises a bandwidth efficient modulation.

12. The method of claim 6 wherein the centroid symbol location represents an average location of the received symbol having undergone the distortion.

13. A method for use in a demodulator comprising:
receiving a given symbol of a constellation corresponding to received signaling, the given symbol having undergone a distortion; and
determining which symbol of the constellation the given symbol actually is received based on a mapping programmed according to decision lines defining each symbol of the constellation, the decision lines adjusted based upon the determined centroid symbol locations for each received symbol of the constellation, the centroid symbol locations different than ideal symbol locations due to the distortion, the decision lines bounding each symbol adjusted to be substantially equidistant between adjacent centroid symbol locations;
wherein the step of determining further comprises predetermining the centroid symbol location prior to operation of a communication system by considering a known source of the distortion.

14. The method of claim 13 further comprising:
determining a probability that each bit of the symbol is correctly determined based on the distance of the symbol from its respective centroid symbol location in order to improve decoding.

15. The method of claim 13 further comprising:
determining the centroid symbol locations for each symbol of the constellation; and
adjusting the decision lines based on the centroid symbol locations.

16. The method of claim 13 wherein each centroid symbol location represents an average location of each symbol received and having undergone the distortion.

17. A demodulator comprising:
an analog to digital converter receiving I and Q data representing received symbols of received signaling; and
a mapping module coupled to an output of the analog to digital converter for determining which symbols of a constellation are actually received based on a mapping programmed according to decision lines defining the symbols of the constellation, the decision lines adjusted based upon determined centroid symbol locations for each received symbol of the constellation, the centroid symbol locations different than ideal symbol locations due to distortion in the received signaling:
wherein the mapping module predetermines the centroid symbol location prior to operation of a communication system by considering a known source of the distortion and determines which of the symbols of the constellation are actually received based on the mapping programmed according to the decision lines, the decision lines bounding each symbol adjusted to be substantially equidistant between adjacent centroid symbol locations.

18. The demodulator of claim 17 further comprising:
a mapping adjustment module coupled to the output of the analog to digital converter, the mapping adjustment module for determining the centroid symbol locations for each received symbol of the constellation; and
the mapping adjustment module for adjusting the decision lines defining each symbol of the constellation based on the centroid symbol locations.

19. The demodulator of claim 18 wherein the mapping adjustment module receives multiple transmissions of each received symbol and averages a location of the multiple transmissions of each received symbol in order to determine the centroid symbol location for each symbol of the constellation.

20. The demodulator of claim 18 wherein the mapping adjustment module programs the mapping module according to the decision lines having been adjusted in order to improve symbol decisions.

21. The demodulator of claim 17 wherein the mapping module determines a probability that each bit of the received symbols is correctly determined based on the centroid symbol locations in order to improve decoding.

22. The demodulator of claim 21 further comprising:
a decoder coupled to the mapping module.

23. The demodulator of claim 17 wherein the distortion is caused by a high power amplifier at a transmitting communication terminal.

24. The demodulator of claim 17 wherein the constellation comprises a bandwidth efficient modulation.

* * * * *